Apr. 24, 1923. 1,452,725
C. K. BROOKS
SHOCK ABSORBING MECHANISM
Filed March 28, 1922   2 Sheets-Sheet 1
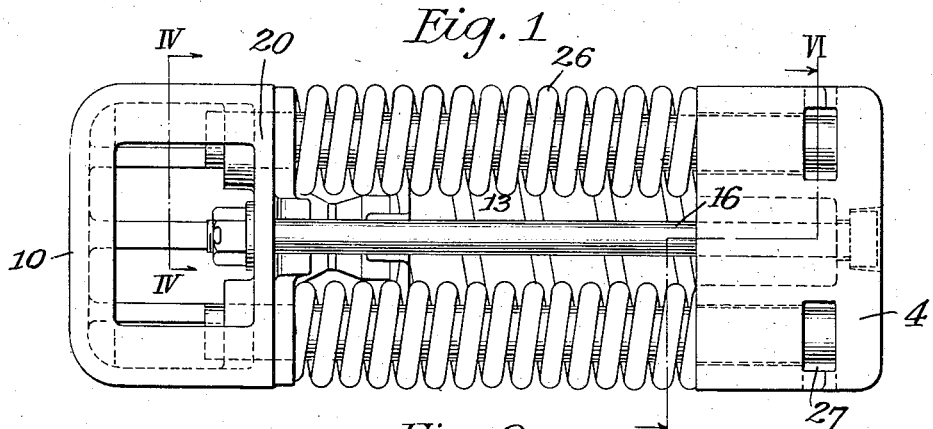
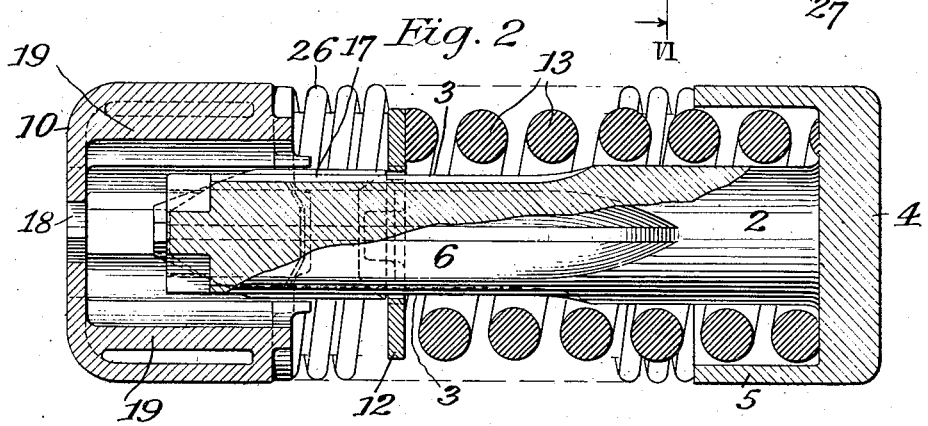
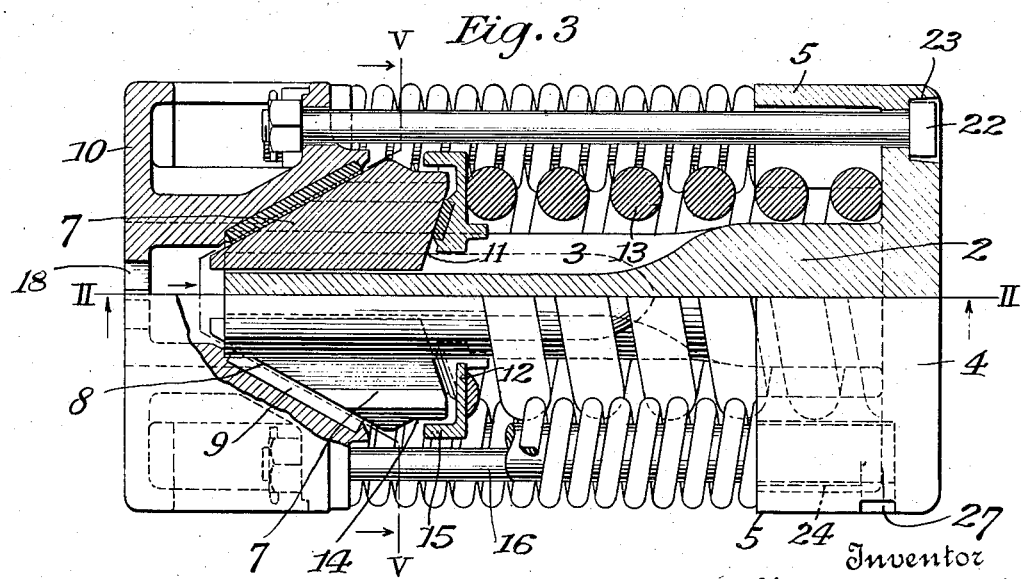
Inventor
Chester K. Brooks
By his Attorney
Clarence D. Kerr Apr. 24, 1923.

C. K. BROOKS

SHOCK ABSORBING MECHANISM

Filed March 28, 1922   2 Sheets-Sheet 2

Inventor
Chester K. Brooks
By his Attorney
Clarence Kerr

Patented Apr. 24, 1923.

1,452,725

UNITED STATES PATENT OFFICE.

CHESTER K. BROOKS, OF MENTOR, OHIO, ASSIGNOR TO THE NATIONAL MALLEABLE CASTINGS COMPANY, OF CLEVELAND, OHIO, A CORPORATION OF OHIO.

SHOCK-ABSORBING MECHANISM.

Application filed March 28, 1922. Serial No. 547,358.

*To all whom it may concern:*

Be it known that I, CHESTER K. BROOKS, a citizen of the United States, residing at Mentor, Lake County, Ohio, have invented new and useful Improvements in Shock-Absorbing Mechanism, of which the following is a specification, reference being had to the accompanying drawings, in which—

Figure 4:
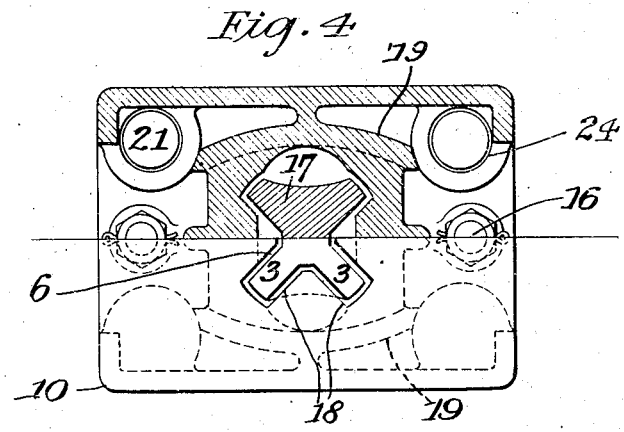
Figure 5:
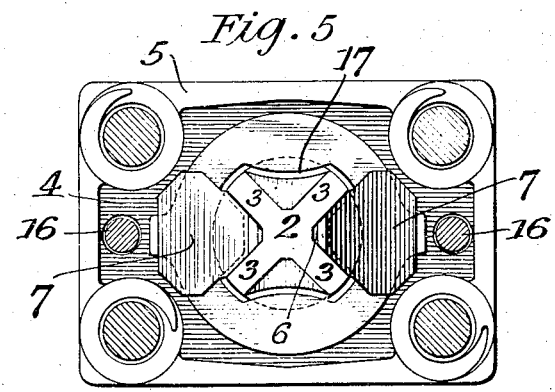
Figure 6:
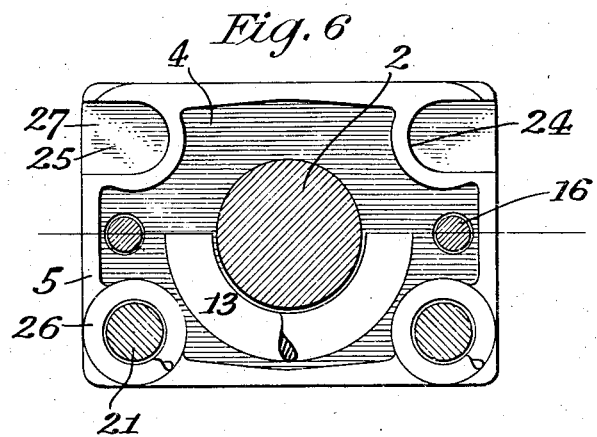

Fig. 1 is a side elevation of my improved shock absorbing mechanism; Fig. 2 is a section on lines II—II of Fig. 3 thereof; Fig. 3 is plan, partly in section thereof; and Figs. 4, 5 and 6 are sections on lines IV—IV of Fig. 1, V—V of Fig. 3, and VI—VI of Fig. 1, respectively.

My invention relates to shock absorbing mechanism, and particularly to friction draft gears for railway vehicles of the type described in Letters Patent No. 1,192,571 of Ernest H. Schmidt, granted July 26, 1916, and No. 1,301,809 of Chester K. Brooks and Ernest H. Schmidt, granted April 29, 1919. My invention comprises a gear in which the central friction member is reinforced to resist extremely heavy stresses which are now imposed by modern service conditions and in the construction and cooperation of the wedge and other members of the device later described and claimed.

Referring to the drawings, 2 indicates a central friction member having longitudinally-extending outwardly radiating arms 3, and terminating at its rear end in an enlarged base 4 which is reinforced by a strengthening wall 5.

In the spaces 6, which are preferably between the outwardly radiating arms 3 on opposite sides of the central member and preferably in the same horizontal plane, are the friction shoes 7. These frictional shoes are formed with frictional faces engaging longitudinally - extending tapered frictional faces on the arms 3 (as set forth in Patent 1,301,809 mentioned above), with a wedging surface 8 engaged by a wedging surface 9 on the front follower 10 and a rear surface 11 against which an intermediate follower 12 bears. Between the intermediate follower 12 and the base 4 and coiled about the central member 2 is the usual compression spring 13. The outer surfaces of the shoes 7 are relieved at 14 to permit the retaining lugs 15 on the intermediate follower 10 to overlap the shoes without interference from the retaining rods 16. The purpose of the lugs 15 is to hold the shoes 7 in place in the event of breakage of the compression spring 13.

The central friction member is formed with frictional faces in only two opposite spaces 6 between the arms 3, and the alternate spaces 17 are made substantially solid to brace and reinforce the arms 3 laterally against the extremely heavy wedging pressures imposed upon the gear in buff and draft. The forward end of the central member is substantially cross-shaped in cross-section so as to permit the opening 18 in the wedge follower 10 for the forward end of the central member (which, when the gear is compressed, enters such opening 18, as is best shown in Fig. 4) to be made as small as possible, since it is important that the forward face of the wedge 10, which receives the buffing stresses, be as uninterrupted as possible.

The follower wedge 10 has interiorly arranged strengthening webs 19 joining the front and rear walls thereof, which are curved to increase their resilience, as these webs are under tension during operation of the gear and tend to straighten out under pressure. The rear wall 20 of the wedge is apertured for reception of the retaining rods 16 and buffing columns 21. The heads 22 of the retaining rods 16 at their rear ends seat in countersunk apertures 23 in the base 4, while the buffing columns 21 operate in sockets 24 in the interior of the wedge and inside the strengthening wall 5 of the base 4 and bear against the inner faces 25 of the base. The buffing columns 21, if desired, may carry release springs 26 to assist the spring 13 in restoring the parts to normal position after the compression abates. Adjacent the points on the base 4 against which the buffing columns buff are apertures 27 to allow dirt to escape and to permit inspection of these buffing surfaces.

I have found that the formation of the wedge 10 with interiorly arranged longitudinally disposed webs 19 enables the wedge 10 to keep a more elastic friction grip on the shoes than in devices in which such webs are not employed. As the wedge follower 10 must necessarily be rectangular in shape, to perform most effectively its dual function of follower and wedge, I have employed only two friction shoes 7, one in each oppositely disposed crotch or space 6, so that the wedging surfaces 9 of the wedge 10, which are arranged symmetrically in the horizontal axis of the gear, will transmit equal pressures to the shoes 7; and through them to the central member 2. This equalized wedging pressure thus not only performs an important function in distributing equalized stresses through the shoes to the central member, but also assists in the ready release of the shoes and wedge, since the resilient grip of the wedge upon both shoes is the same.

Gears constructed in accordance with my invention have a very positive release action, even without the use of release springs, and operate very smoothly and regularly under compression as well as in release. As they are of very rugged construction, when in service they are capable of withstanding extremely severe conditions. These results are mainly due to the form of the wedge and the use and arrangement of the friction shoes which distribute evenly the wedging pressures and frictional resistance.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In frictional shock absorbing mechanism, a longitudinally-extending included friction member having a plurality of radially disposed arms, certain of the spaces between the arms having diverging longitudinally extending laterally tapered friction faces, a friction shoe in each such space engaging such faces, each shoe having an inclined wedging face, and a wedge member engaging the wedging face of each shoe and being capable of expansion under pressure from the shoes as the shoes move longitudinally and laterally along the said tapered friction faces and having an elastic grip upon said shoes, said wedge having reinforcing webs arranged under tension in buffing and pulling to be deformed and to resist expansion of the wedge.

2. In frictional shock absorbing mechanism, a longitudinally extending included friction member having a plurality of radially disposed arms, certain of the spaces between the arms having diverging longitudinally extending and laterally tapered friction faces, a friction shoe in each such space engaging such faces, each shoe having an inclined wedging face, and a wedge member engaging the wedging face of each shoe and being capable of expansion under pressure from the shoes as the shoes move longitudinally and laterally along the said tapered friction faces and having an elastic grip upon said shoes, said wedge having curved reinforcing webs arranged under tension to straighten out in resisting expansion of the wedge.

3. In frictional shock absorbing mechanism, a longitudinally-extending included friction member, having two longitudinally-extending V-shaped slots symmetrically arranged with regard to the axis of the central member and having friction faces, the member between the outer edges of the slots being substantially solid metal to resist compressive stresses, friction shoes operating in said slots, a wedge engaging said shoes, and a compression spring.

4. In frictional shock absorbing mechanism, a longitudinally-extending included friction member, having two longitudinally extending V-shaped slots along the sides thereof, the bisectors of said slots lying in the same horizontal plane, the top and bottom of the friction member being reinforced to resist compressive stresses, friction shoes operating in said slots, a wedge engaging said shoes, and a compression spring.

5. In frictional shock absorbing mechanism, a longitudinally-extending included friction member, having a plurality of radially disposed arms, alternate spaces between the arms being formed for the reception of friction shoes, and the remaining spaces in the region of the shoes being partially filled with solid metal to resist compressive stresses transmitted through the shoes, the forward end of the central member being of symmetrical cross section, a compression spring, and a wedge, the wedge having an opening therethrough of a shape corresponding to that of the forward end of the central member.

CHESTER K. BROOKS.